(12) United States Patent
Beekmann et al.

(10) Patent No.: US 10,502,185 B2
(45) Date of Patent: Dec. 10, 2019

(54) METHOD FOR OPERATING A WIND TURBINE

(71) Applicant: Wobben Properties GmbH, Aurich (DE)

(72) Inventors: Alfred Beekmann, Wiesmoor (DE); Marcel Kruse, Beverstedt (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/554,981

(22) PCT Filed: Feb. 26, 2016

(86) PCT No.: PCT/EP2016/054092
§ 371 (c)(1),
(2) Date: Aug. 31, 2017

(87) PCT Pub. No.: WO2016/139145
PCT Pub. Date: Sep. 9, 2016

(65) Prior Publication Data
US 2018/0045180 A1    Feb. 15, 2018

(30) Foreign Application Priority Data

Mar. 4, 2015   (DE) .................. 10 2015 203 841

(51) Int. Cl.
*F03D 9/00* (2016.01)
*H02P 9/04* (2006.01)
(Continued)

(52) U.S. Cl.
CPC .......... *F03D 7/0276* (2013.01); *F03D 7/028* (2013.01); *F03D 7/048* (2013.01); *F03D 9/25* (2016.05);
(Continued)

(58) Field of Classification Search
CPC ........ F03D 7/0276; F03D 7/028; F03D 7/048; F03D 7/046; F03D 9/25
See application file for complete search history.

(56) References Cited

U.S. PATENT DOCUMENTS 4,160,170 A * 7/1979 Harner ................. F03D 7/0224
                                                                290/44
6,809,431 B1   10/2004 Schippmann
(Continued)

FOREIGN PATENT DOCUMENTS

CN      103119291 A    5/2013
DE      195 32 409 A1  3/1997
(Continued)

*Primary Examiner* — Tulsidas C Patel
*Assistant Examiner* — Thomas K Quigley
(74) *Attorney, Agent, or Firm* — Seed Intellectual Property Law Group LLP

(57) ABSTRACT

A method for operating a wind turbine is disclosed. The rotational speed and power of the wind turbine are reduced when the prevailing wind speed exceeds a predetermined first limit value. The rotational speed and power are reduced further with an increasing wind speed until the rotational speed reaches a predetermined minimum rotational speed and/or the power reaches a predetermined minimum power. The wind energy turbine maintains the minimum rotational speed, or the minimum power, if the wind speed increases even further.

14 Claims, 3 Drawing Sheets

(51) Int. Cl.
*F03D 7/02* (2006.01)
*F03D 7/04* (2006.01)
*F03D 9/25* (2016.01)

(52) U.S. Cl.
CPC ........ *F03D 7/046* (2013.01); *F05B 2270/101* (2013.01); *F05B 2270/1014* (2013.01); *F05B 2270/1033* (2013.01); *F05B 2270/32* (2013.01); *F05B 2270/327* (2013.01); *F05B 2270/335* (2013.01); *Y02E 10/723* (2013.01); *Y02E 10/725* (2013.01)

(56) References Cited

U.S. PATENT DOCUMENTS

| | | | |
|---|---|---|---|
| 6,856,042 B1 * | 2/2005 | Kubota | F03D 1/025 290/55 |
| 7,566,982 B2 | 7/2009 | Voss | |
| 8,053,916 B2 * | 11/2011 | Edwards | F03B 13/142 290/44 |
| 8,129,852 B2 * | 3/2012 | Edwards | B63B 39/02 290/44 |
| 8,202,048 B2 | 6/2012 | Stiesdal et al. | |
| 9,178,457 B2 * | 11/2015 | Hsiao | H02P 9/02 |
| 9,567,975 B2 | 2/2017 | Hansen et al. | |
| 2006/0273595 A1 * | 12/2006 | Avagliano | F03D 7/028 290/44 |
| 2007/0216166 A1 | 9/2007 | Schubert | |
| 2010/0045041 A1 | 2/2010 | Andersen | |
| 2010/0133826 A1 * | 6/2010 | Santiago | F03D 7/0272 290/44 |
| 2011/0144817 A1 * | 6/2011 | Teichmann | F03D 7/0284 700/287 |
| 2013/0147201 A1 * | 6/2013 | Roesner | H01F 38/18 290/55 |
| 2013/0154263 A1 * | 6/2013 | Attia | H02P 9/007 290/44 |
| 2013/0161950 A1 | 6/2013 | Hsiao et al. | |
| 2014/0110948 A1 * | 4/2014 | Semmer | H01F 1/015 290/55 |
| 2014/0152010 A1 | 6/2014 | Larsen et al. | |
| 2015/0200543 A1 * | 7/2015 | Nielsen | F03D 7/048 307/87 |

FOREIGN PATENT DOCUMENTS

| | | |
|---|---|---|
| DE | 198 44 258 A1 | 3/2000 |
| DE | 10 2004 024 564 A1 | 12/2005 |
| JP | 2008274953 A | 11/2008 |
| JP | 2009068379 A | 4/2009 |
| JP | 2014-077427 A | 5/2014 |
| NZ | 316943 A | 11/1998 |
| WO | 2015/074664 A1 | 5/2015 |
| WO | 2015/135549 A1 | 9/2015 |

\* cited by examiner

METHOD FOR OPERATING A WIND TURBINE

BACKGROUND

Technical Field

The present invention relates to a method for operating a wind turbine and to a method for operating a wind park. The present invention furthermore relates to a wind turbine and to a wind park.

Description of the Related Art

Such wind turbines are widely known. They take energy from the wind and convert it into electrical energy, which is often also referred to as generation of electrical energy for simplicity. It can be problematic, in particular, when the wind speed is so high that it can endanger the wind turbine. For a long time, it was the case that wind turbines were switched off in the event of very high wind speeds loading the wind turbine. In any event, turning off abruptly at rated power has proven unfavorable. It is, moreover, unfavorable not only because energy can no longer be generated, but also that it is often only possible to switch on again at significantly reduced wind speeds. This gave rise to a hysteresis function for the generated electrical power as a function of the wind speed in this range of high wind speeds entailing a hazardous load.

Teaching according to European Patent 0 847 496 B1 was proposed for assistance. It is described therein that the wind turbine continues to be operated when reaching a wind speed at which it would previously have been switched off, the rotational speed and the power being reduced with an increasing wind speed. Although protection of the wind turbines is achieved at such high wind speeds, it is still possible to continue to operate, albeit at a reduced power.

This solution has fundamentally proven itself. Since then, however, wind turbines have become larger. In particular, they now regularly have higher axis heights and larger rotor blades. There are thus even greater attack surfaces which also have to withstand loads at high wind speeds. Furthermore, with a greater height it is generally also necessary to reckon with higher wind speeds.

Added to this, in the future it may be necessary to reckon with more gales and therefore usually in association with more gusts.

BRIEF SUMMARY

Embodiment described herein relate essentially to wind turbine types with horizontal axes, namely wind turbine types in which the rotor rotates about an essentially horizontally arranged rotation axis, which is preferably turned in the direction of the wind for operation. The rotation axis may have a slight inclination with respect to the horizontal, but is arranged essentially horizontally so that one or more rotor blades rotating about it span a rotor blade plane, which is essentially perpendicular to the wind.

Provided is a solution which takes into account dealing with high wind speeds, as much as possible provides an improvement, and as much as possible also takes into account the relevant wind turbines, at least in terms of their size and/or axis height. At least, an alternative solution to previously known solutions is intended to be provided.

Provided is a method in which:
the rotational speed and power of the wind turbine are reduced when the prevailing wind speed exceeds a predetermined first limit value,
the rotational speed and power are reduced further with an increasing wind speed until the rotational speed has reached a predetermined minimum rotational speed and/or the power has reached a predetermined minimum power, and
the wind turbine maintains the minimum rotational speed, or the minimum power, if the wind speed increases even further.

The rotational speed and the power of the wind turbine are thus reduced beyond a predetermined first limit value, namely from this value on with a wind speed increasing further. A wind speed-dependent rotational speed and power reduction is thus proposed. The rotational speed or the power, but in particular the rotational speed and the power, are not reduced to zero in this case but are reduced only as far as a minimum value. This would be a minimum rotational speed for the rotational speed and a minimum power for the power. The minimum rotational speed, or minimum power, are then intended to be maintained if the wind speed increases even further. In this case, it is not important for this value to be kept exactly, but that the wind turbine is managed in such a way that the rotational speed or the power are not reduced further, in particular not reduced to zero, if the wind speed continues to increase.

This proposal is firstly based on the realization that, as before, it seems expedient to reduce the rotational speed and power of the wind turbine when a wind speed endangering the wind turbine is exceeded, so as to reduce or limit the load on the wind turbine. It has, however, also been discovered that continued operation of the wind turbine with a low rotational speed or power can even be carried out with such high wind speeds without damage to the wind turbine. Rather, it has been found that it may even be helpful if the wind turbine continues to rotate somewhat.

Firstly, the solution is based on a wind turbine with adjustable rotor blades. Beyond a rated wind speed which is significantly lower than the first limit value, these rotor blades continue to rotate with the wind as the wind becomes stronger. Herein not only is the attack surface of the rotor blade reduced with respect to the wind, but also the force direction changes—expressed simplistically—from a direction transverse to the blade surface to a direction parallel to the blade surface. The adjustment of the rotor blades already provides a great load reduction. During the further adjustment towards this low power or rotational speed, adjustment in the vicinity of the feathering position already provides a great reduction of the load, and the load is thus already very low in this case.

Furthermore, it is now advantageous to keep the wind turbine in operation, also including the azimuthal setting, i.e., to maintain the orientation of the wind turbine with respect to the wind. In this way, in particular, it is also possible to ensure that the wind continues to come from in front and therefore from the direction which now has the weakest load. If the wind turns without the wind turbine tracking it, this may lead to the wind suddenly finding a larger attack surface on at least one rotor blade, and furthermore that the blade is blown from a less favorable direction. To reuse the simplification mentioned above, the wind could even now again blow against at least one rotor blade transversely to the blade surface.

One of the discoveries according to the invention is now that continued operation of the wind turbine at a very low level is the simplest and most efficient response to this problem. In other words, the wind turbine continues to be operated entirely normally, at least as regards the azimuthal direction of the wind turbine. The rotational speed or the power, however, are very low and the blades are turned very far out of the wind.

In other words, it has also been discovered that it is an incorrect assumption that the wind turbine is best protected by switching it off. In fact, when it is switched off, the wind turbine is left essentially without control to the natural force of the wind. The embodiments herein differ therefrom.

Furthermore, it is also not to be ignored that bearings, in particular, can suffer when they are unoperated for too long. Although a wind turbine turned off for a short period of time will not entail damage to a bearing, if it is turned off for a longer time a problem may nevertheless arise in this case. In particular, one bearing, usually both bearings, which support the rotor, must satisfy very high loads and requirements. It may in this case be dangerous to leave them at rest for too long. Naturally, such bearings may also suffer damage due to unfavorable wind conditions and unfavorable operation in a strong wind. The proposed solution, however, presupposes operation at low power and rotational speed in the case of very high wind speeds. Furthermore, the above described significant load reduction by the adjustment of the rotor blades almost into the wind also leads to a load reduction of these rotor bearings. Although the load on the rotor bearing or bearings is reduced significantly with the solution, continued rotation is nevertheless ensured.

Preferably, it is also proposed that, if the wind speed increases even further, the wind turbine maintains the minimum rotational speed, or the minimum power, for any wind speed which is still as high, and is not switched off. The effect achieved by this is that, even with very high wind speeds, including gale and hurricane conditions, the wind turbine can be kept in a low-load situation.

According to one embodiment, the method is carried out in such a way that, when the predetermined minimum rotational speed is reached, or when the predetermined minimum power is reached, the rotor blades have their blade angle adjusted so that the power taken from the wind remains constant. This means that, firstly, the rotational speed and/or the power are monitored and used as an input quantity. The rotational speed or the power may be monitored. Both may together reach their respective limit value, i.e., minimum rotational speed or minimum power, when the system is regulated accordingly. In this case, both quantities may be taken into account simultaneously. Preferably, only one of the two is taken into account, in order to avoid any conflict.

If this value is reached, the wind turbine continues to be operated in such a way that, by blade adjustment, the power taken from the wind remains constant. This may, for example, be done with a constant predetermined torque or counter-torque when, for example, in the case of an externally excited synchronous machine, which is therefore proposed as a preferred variant, the excitation is kept constant. In this and similar cases, even in the event of a gale, the proposed regulation of the wind turbine may be carried out in such a way that the power is monitored and the blade angle is adjusted as a function thereof. It is thus no longer necessary to have a wind measurement, which may be difficult particularly in the case of such high wind speeds, which regularly occur with strong gusts.

In the case of regulation of the power to a constant value, it is therefore not so important for this to be maintained exactly and accurately, but rather that it is essentially and/or on average constant. In this way, specifically, the wind turbine is kept at this desired low value and can simultaneously generate power. The generated power may and should be low, but preferably such that operation of the wind turbine is ensured. It is thus expedient to generate at least as much power as is sufficient to supply operating devices of the wind turbine with electric current, so that the wind turbine can be operated. In particular, operation of the adjustment device for setting the azimuthal direction is important in this case.

Preferably, this power, i.e., the minimum power, is at least twice as great as is necessary in order to supply the operating devices of the one wind turbine, so that a further wind turbine of the same size can be operated with the extra power generated.

The latter alternative applies in particular to the operation of a plurality of wind turbines in a wind park. This may, for example, contain differently equipped wind turbines, or a certain failsafe level may be ensured. There would thus be a certain power margin which, although it may be used to operate a further, for example neighboring, wind turbine, may nevertheless also be used for the same wind turbine, for example, by being able to temporarily store and provide a part in an electrical energy store.

According to another embodiment, the predetermined first limit value depends on a gustiness and/or a gust frequency of the prevailing wind, and/or the rotational speed and the power are reduced in the event of a high gustiness or gust frequency of the wind before the prevailing wind speed has reached the predetermined first limit value.

It is, therefore, proposed for the gustiness, and additionally or alternatively a gust frequency of the prevailing wind, to be incorporated into the method. One possible definition of a gust would be when that the measured 1 minute average value of the wind speed is exceeded by at least 3 m/s within a few seconds, for example lasting at most 20 seconds and at least 3 seconds. Accordingly, a gust may be identified on the basis of this definition and it is therefore also possible to count gusts and therefore their frequency, i.e., to determine the occurrence per time interval.

In particular, it is proposed to reduce the first limit value of the prevailing wind speed when there is a high gust frequency. Here again, as in all other embodiments, the measured 1 minute average value of the wind speed may be used as the prevailing wind speed. As an alternative or in addition, the rotational speed and the power may be reduced in the event of a high gustiness or gust frequency of the wind, before the prevailing wind speed has reached the predetermined first limit value. In principle, in both ways, it is possible to ensure that the rotational speed or power is reduced earlier in the event of strong gustiness or a high gust frequency, i.e., with a lower wind speeds.

The background for this idea is that, because of gusts, the wind speed can suddenly increase within a few seconds to a value which may lead to an undesirably high load on the wind turbine, because the wind turbine cannot be adjusted rapidly enough thereto. An undesirably high load, for example due to a gust or generally due to a somewhat higher wind speed, does not mean that the wind turbine immediately suffers irreparable damage, or possibly a rotor blade breaks. Rather, in general wear increases first or a fatigue phenomenon occurs more rapidly, and in other words the lifetime can be shortened when undesirably high loads occur too often, for too long and/or too greatly. In the case of a high gust frequency, without this measure of relatively strong reduction of the rotational speed and/or power a wind speed would very frequently have the effect, at least temporarily, of an undesirably high load on the wind turbine. Because of the corresponding frequency, this would in the long term lead to a reduction of the lifetime of the wind turbine or of individual parts thereof.

Similar considerations apply when the gusts occurring are particularly strong, i.e., they exceed the measured 1 minute average value of the wind speed by significantly more than 5 m/s. Then, for example, there may possibly not be a high gust frequency, but instead particularly strong gusts. The temporary overload, i.e., loading above the desired value, would then not be very frequent, but would be commensurately stronger. As a result, this could in the long term also lead to a reduction of the lifetime of the wind turbine. To this extent, the value by which an average gust exceeds the 1 minute average value of the wind speed may be used as a basis for the level or strength of the gustiness. If the minimum value of 5 m/s, by which the wind speed exceeds its 1 minute average value, is used for normalization, i.e., is set to one, then average exceeding of the wind speed of a gust by 10 m/s, to give a clear example, would give gustiness twice as great as in the case of an exceeding value of 5 m/s.

Naturally, both values may also be taken into account, namely the frequency of the gusts and the gustiness, i.e., strength of the average gust. Thus, if there is a high gust frequency and a high gustiness, the rotational speed and/or the power should be reduced at even lower wind speeds.

Furthermore, and this applies for all embodiments, the first limit value of the wind speed lies at a value of the wind speed at which would previously have been switched off, specifically in the sense of the aforementioned document EP 0 847 496 B1. In particular, this first limit value is placed at a value at which undesirably high loads would occur during rated operation. Preferably, the first limit value of the wind speed is about 23 to 28 m/s, in particular about 25 m/s.

Preferably, the wind turbine is operated in such a way that, if the wind speed increases further, i.e., beyond the first limit value, the rotational speed and/or power are reduced continuously with a further increasing wind speed, until the wind speed has reached a second limit value. This second limit value preferably lies significantly above the first limit value, for example at least 8 m/s or preferably 15 m/s above the first limit value. In this range, i.e., in the range of 25 m/s, 4 m/s correspond to about one wind force in the sense of the Beaufort scale. The second limit value would thus then lie at least one, or preferably at least two, wind forces above the first limit value.

Preferably, the minimum rotational speed is at most 20%, in particular at most 10% of the rated rotational speed. Preferably, it is at least 5%, in particular at least 10% of the rated rotational speed. The minimum rotational speed is therefore significantly lower than the rated rotational speed, albeit much greater than if the wind turbine were stopped.

Preferably, the minimum power is at most 20% of the rated power, preferably at most 10% of the rated power of the wind turbine. It is furthermore proposed that the minimum power can be reduced to 0% or is at least 2%, in particular at least 5% of the rated power. The minimum power therefore has a significantly lower value than the rated power, and is at the same time still great enough to operate operating devices of the wind turbine.

Furthermore, it has also been discovered that not only can a gale represent a mechanical load for the wind turbine, but also that in such situations the likelihood of a network outage is greater. Specifically, an existing network is necessary not only for feeding electrical energy in, but also for taking electrical energy from this network in order to supply operating devices of a wind turbine when the wind turbine is not generating its own current. Embodiment herein solve this problem in that, even in the event of a network outage during a gale, the operating devices of the wind turbine can still be supplied with current. In particular, even in the event of a network outage during a gale, the azimuthal control including the corresponding drives can be operated and the wind turbine can be turned into the wind. In this way, the loads can be minimized.

Preferably, the minimum rotational speed at which the wind turbine is operated even above the second limit wind speed, has a value of about 4 rpm to 8 rpm, in particular 6 rpm. Particularly in the case of gearless wind turbines, such a rotational speed may be sufficient in order to avoid degradation of the wind turbine, i.e., in order particularly to avoid damage due to unnecessary stationary times.

Preferably, to this end it may be sufficient to generate no power and only to operate the wind turbine with a low rotational speed. It is advantageous to generate only as much power as can operate the wind turbine, i.e., so that the operating devices can be supplied.

The operation of the operating devices may relate to an azimuthal adjustment, the pitch, i.e., the setting of the rotor blades, as well as the supply of controllers. Optionally, it may also relate to deicing, i.e., sufficient power is generated in order to operate in particular heating devices for deicing the rotor blades.

A method for operating a plurality of wind turbines is provided. In this case, a plurality of wind turbines, in particular of a park, are respectively operated in such a way that at least one of the above embodiments for operating a wind turbine is obtained.

Preferably, in this case at least two of the wind turbines are coupled to one another in such a way that one wind turbine transmits power to the other wind turbine, with which the other wind turbine operates its operating devices.

The effect achievable in this way, particularly in the event of a gale, is that the wind turbines have their rotational speed and/or power reduced to a minimum rotational speed or minimum power, and for the case in which a wind turbine is temporarily not generating enough power of its own to operate its operating device, it can be supplied with this necessary power by a further wind turbine.

Preferably, a wind turbine can still supply another wind turbine during operation above the first limit value of the wind speed with enough power that this further wind turbine can supply its operating devices. This is, in particular, also advantageous during operation above a second limit value of the wind speed, namely during operation with the minimum rotational speed or minimum power. In particular, enough power may be transmitted for this other wind turbine to be able to carry out an azimuthal adjustment. In particular, the azimuthal adjustment ensures that the wind turbine can be turned into the wind and, with rotor blades turned fully or almost into the feathering position, a load can thereby be kept at a minimum. This would then also be possible for a wind turbine which—for whatever reason—cannot itself provide enough power for its own azimuthal adjustment. This azimuthal adjustment would nevertheless still be possible when another wind turbine, in particular a neighboring wind turbine and/or a wind turbine arranged in the same wind park, can provide additional power.

Preferably, to this end a plurality of wind turbines are arranged in a wind park and are controlled by a central park controller, in order to coordinate such power distributions between wind turbines which are generating surplus power and wind turbines which are not generating enough power.

A wind turbine is provided which is operated according to at least one of the above embodiments which describe the operation of an individual wind turbine. Preferably, such a wind turbine is gearless so that an aerodynamic rotor directly drives an electrodynamic rotor of the generator.

Preferably, the generator is a synchronous generator, and particularly preferably one with external excitation, i.e., a synchronous generator on the rotor of which a direct current is controlled and generates a magnetic field, and the strength of the magnetic field can be controlled by means of the level of the direct current. Furthermore, the torque may also be controlled or adjusted. In particular, such a wind turbine is advantageously operated in such a way that it continues to be operated with a low rotational speed and power even in the event of very high wind speeds, including ranges of gale, strong gale or even hurricane. With a correspondingly low power and rotational speed, there is also correspondingly a low torque and the wind turbine can therefore be operated with a smaller mechanical load. In this case, it continues to be operated in such a way that, in particular, precise guiding bearings of such a gearless concept can remain at least somewhat in movement. Particularly in the case of gearless wind turbines, the same bearing or the same bearings often guide the aerodynamic rotor and the electrodynamic rotor at the same time. The guiding of the electrodynamic rotor in this case requires particular accuracy, specifically in order to maintain the corresponding air gap between the electrodynamic rotor and the stator of the generator.

A wind park is provided which has individual wind turbines operated as described above according to at least one embodiment, and preferably in this case also an interaction between at least two wind turbines of such a park. In this way, the operation of the wind turbines can also be particularly reliable and sometimes redundant, and in particular the orientation of each of the wind turbines of the wind park in the optimal azimuthal position can be achieved.

BRIEF DESCRIPTION OF THE SEVERAL VIEWS OF THE DRAWINGS

The invention will be explained below by way of example with the aid of figures.

DETAILED DESCRIPTION

Figure 1:
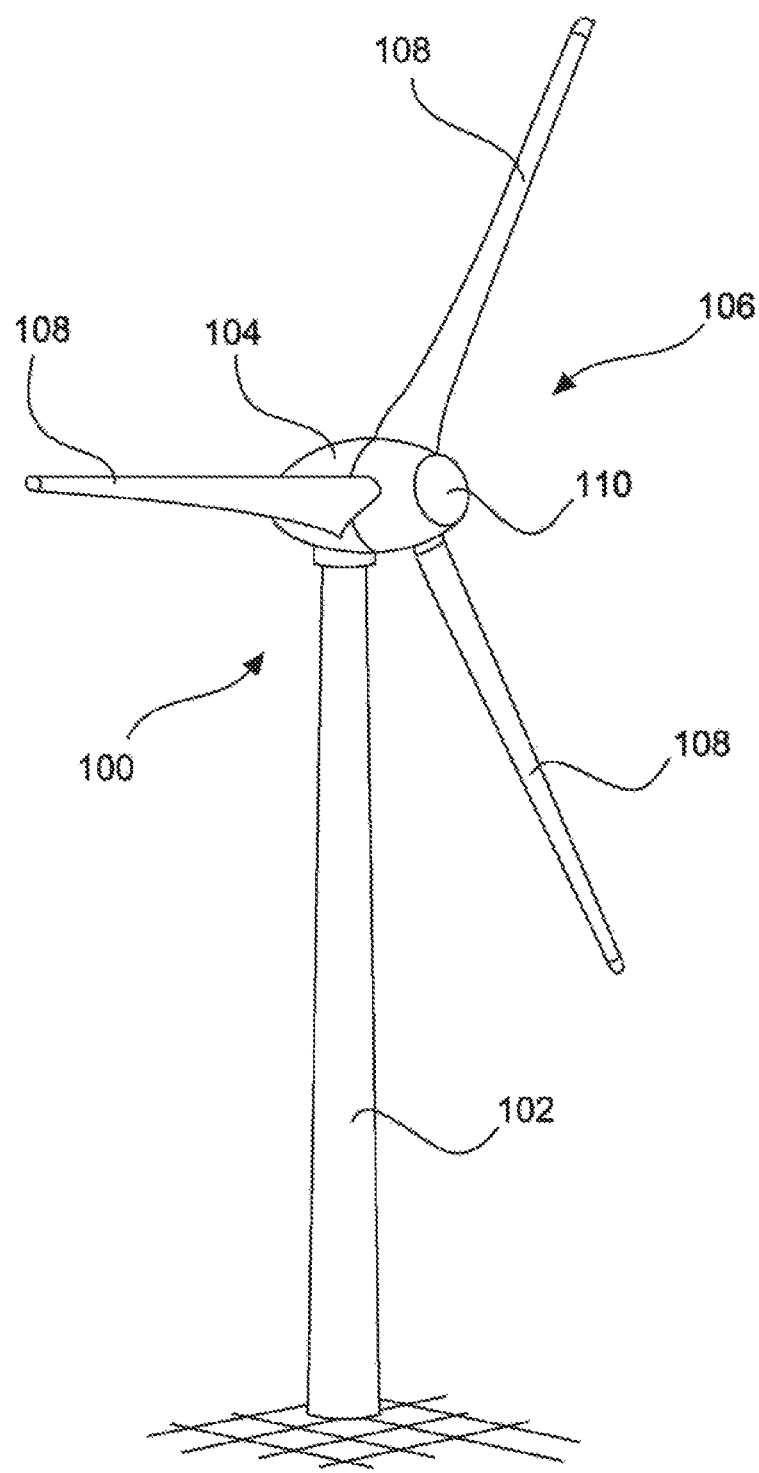
FIG. 1 schematically shows a wind turbine.

FIG. 1 shows a wind turbine 100 having a tower 102 and a nacelle 104. A rotor 106 having three rotor blades 108 and a spinner 110 is arranged on the nacelle 104. During operation, the rotor 106 is set in a rotational movement by the wind and thereby drives a generator in the nacelle 104.

Figure 2:
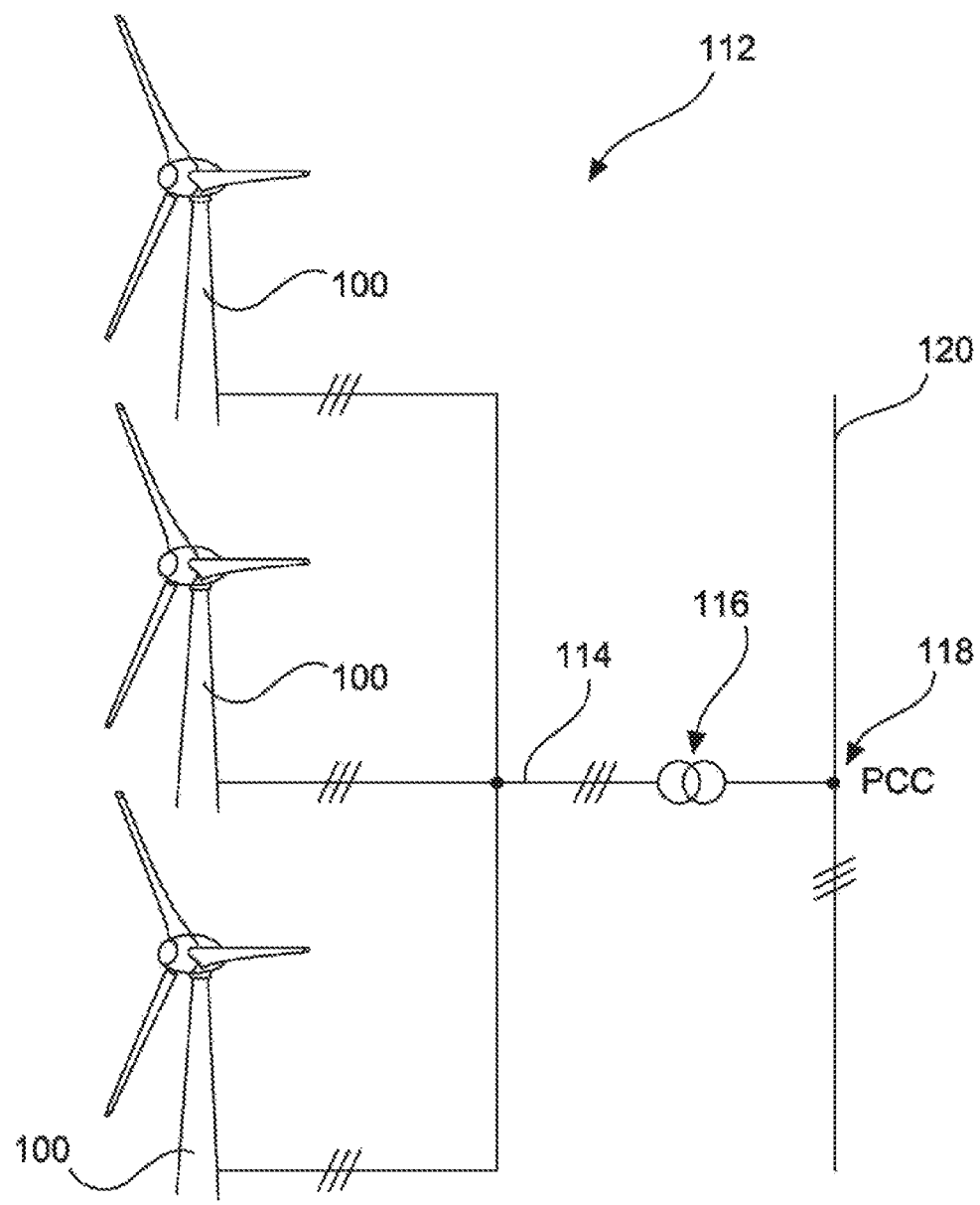
FIG. 2 schematically shows a wind park.

FIG. 2 shows a wind park 112 with, by way of example, three wind turbines 100 which may be identical or different. The three wind turbines 100 are therefore representative for, in principle, any number of wind turbines of a wind park 112. The wind turbines 100 provide their power, i.e., in particular the generated current, via a park electrical network 114. In this case, the respectively generated current or powers of the individual wind turbines 100 are added together, and a transformer 116 is usually provided which steps up the voltage in the park and then feeds it into the supply network 120 at an input point 118, which is generally also referred to as PCC. FIG. 2 is only a simplified representation of a wind park 112, which for example does not show a controller, even though there is naturally a controller. Also, for example, the park network 114 may be configured differently, for example by there also being a transformer at the output of each wind turbine 100, to mention only one other exemplary embodiment.

Figure 3:
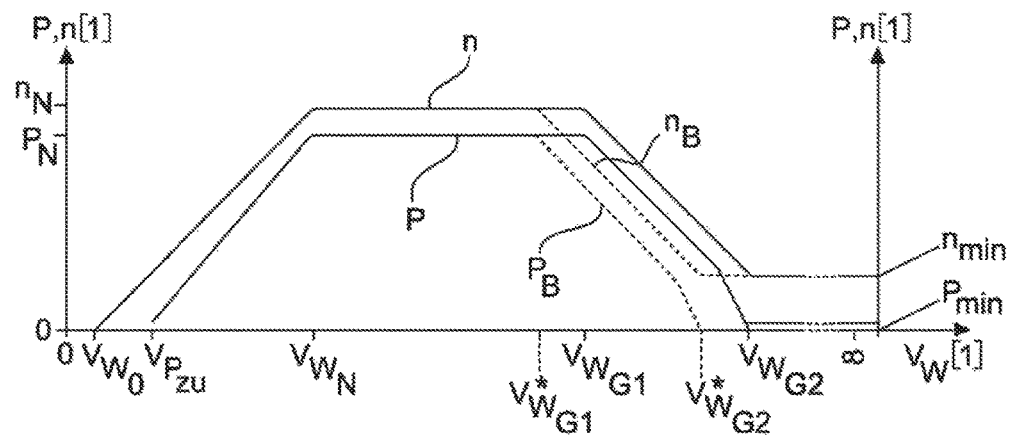
FIG. 3 schematically shows a diagram of the dependency of the power and the rotational speed on the wind speed.

FIG. 3 shows the profile of the rotational speed n and of the power P as a function of the wind speed $V_w$. Accordingly, starting from the initial wind speed $V_{w0}$ the rotational speed n increases. It increases as far as the rated wind speed $V_{wN}$. The power P begins at the starting wind speed $V_{Pzu}$ with a small value. At this wind speed $V_{Pzu}$, for example, the excitation of the rotor of the generator is switched on, so that power is now generated for a first time, i.e., at this low speed. The power P then increases further up to the rated wind speed $V_{wN}$. This range from $V_{Pzu}$ to $V_{wN}$ is also referred to as the partial load range. The profiles of the power P and of the rotational speed n are represented linearly here for simplicity and are usually strictly monotonically increasing, but not linearly, but rather with a curved profile.

At the rated wind speed $V_{wN}$, both values now reach their rated values, i.e., the rotational speed n reaches its rated rotational speed $n_N$ and the power P reaches its rated power $P_N$. Both are moreover usually system properties of the wind turbine, for which the latter is configured, and in particular the generator is configured. This applies in particular for a gearless wind turbine, in which the rotational speed n of the aerodynamic rotor is the same as the rotational speed n of the electrodynamic rotor of the generator.

When the wind speed increases further, the power P and the rotational speed n remain at their rated values. To this end, in particular, the attitude angle of the rotor blades with respect to the wind is modified. Specifically, with an increasing wind, the rotor blades are turned away from the wind, i.e., in the direction of a feathering position. This is carried out as far as the first limit wind speed $V_{WG1}$. This first limit value $V_{WG1}$ lies, in particular, at or at the end of wind force 9 according to the Beaufort scale and therefore at the transition from gale to severe gale.

At this first limit wind speed, the rotational speed n as well as the power P are then reduced as far as the second limit wind speed $V_{WG2}$. There, they then reach their minimum values, namely the minimum power $P_{min}$ and minimum rotational speed $n_{min}$.

The reduction of the power P and of the rotational speed n from the first limit wind speed $V_{WG1}$ to the second limit wind speed $V_{WG2}$ is represented approximately linearly in FIG. 3. A linear reduction is a preferred embodiment, although the reduction may be carried out in another way for the power P and/or the rotational speed n, for example a parabola or composite parabola or a sine function, for example a section of a sine function from 90° to 270° displaced into the positive range, to mention only one advantageous example.

The first limit wind speed $V_{WG1}$ and the second limit wind speed $V_{WG2}$ are used here synonymously for the first limit value of the prevailing wind speed and the second limit value of the prevailing wind speed. At the second limit wind speed, the power P and the rotational speed n then reach their minimum values $P_{min}$ and $n_{min}$, respectively, at which they are then kept even if the wind speed $V_w$ continues to increase. The symbol ∞ is symbolically indicated there, in order to illustrate that these two minimum values are maintained even in the event of, in principle, arbitrarily higher wind speeds. Naturally, the wind speed does not reach the "value" ∞ and this is used only for illustration.

In the schematic representation of FIG. 3, both the power P and the rotational speed n are respectively normalized to their rated values. According to the representation, the minimum rotational speed $n_{min}$ is about 25% of the rated rotational speed $n_N$, and the minimum power $P_{min}$ is about 0% of the rated power $P_N$, i.e., it is reduced to zero or almost zero in this embodiment, although a higher value may be envisaged. These are only illustrative values, and 25% of the rated rotational speed is a very high value, which should preferably be lower. It is, however, realistic for the minimum power $P_{min}$ to be reduced more greatly relative to its rated power $P_n$ than the minimum rotational speed $n_{min}$ to be reduced relative to its rated rotational speed $n_N$, because otherwise there would still be a maximum torque in this range of very high wind speeds, i.e., above the second limit wind speed. Preferably, however, the torque is also reduced so that the power is correspondingly reduced even further with a reduction of the rotational speed. The reason resides in the relationship between the power P, the rotational speed n and the torque m according to the formula $P=n \times m$.

Figure 4:
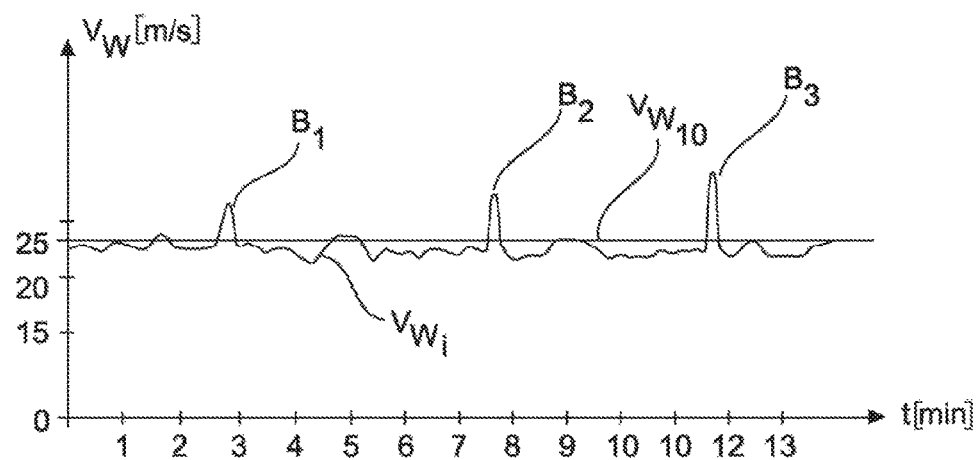
FIG. 4 illustrates in a schematic diagram a wind speed profile for gusts, represented as a function of time.

FIG. 4 illustrates very schematically the profile of the wind speed $V_w$ as a function of time t. The more strongly varying curve is intended to represent the actual wind speed, in particular the instantaneous wind speed $V_{wi}$, whereas the very uniform curve represents the 1 minute average value $V_{w1}$. The schematic example depicts about 13 minutes and the instantaneous wind speed $V_{wi}$ has three gusts $B_1$ to $B_3$ in the period of time represented. There is therefore a gust frequency of three gusts in 13 minutes, i.e., approximately one gust every four minutes. This would be a relatively low frequency of the gusts.

The outlined level of the gusts reaches about 7 m/s to 15 m/s above the 1 minute average value $V_{wi}$. The gust height would in this case be on average about 10 m/s above the 1 minute average value and therefore twice as high as the minimum height of a gust, namely 5 m/s above the 1 minute average value. Here, the gustiness could thus be indicated by the value 2. This gustiness of 2 would be an average value and furthermore corresponds approximately to a conventional weather situation in which a gust is about two wind forces above the minimum wind speed.

According to one embodiment, the first limit wind speed $V_{wG1}$ is reduced as a function of the gust frequency and/or the gustiness or strength of the gusts. This is represented in FIG. 3 by the dashed branch of the rotational speed $n_B$ and for the power P by the dashed branch $P_B$. A gust-dependent shift is thus outlined there. The limit wind speeds $V_{wG1}$ as well as $V_{wG2}$ have not been modified in the representation, but as a result the wind speed values at which the power P or $P_B$ on the one hand and the rotational speed n or $n_B$ on the other hand are reduced have been shifted to lower wind speed values. These modified values are denoted as $V^*_{wG1}$ and $V^*_{wG2}$ on the abscissa.

If the two FIGS. 3 and 4 are considered together, the gust frequency, which is very low, would not, or would only to a small extent, lead to the indicated shift of the gust-dependent power $P_B$ and the gust-dependent rotational speed $n_B$. The gustiness or strength of the gusts according to FIG. 4 has a moderate value and would therefore lead according to the corresponding embodiment to a shift of the power $P_B$ or rotational speed $n_B$.

The invention claimed is:

1. A method for operating a wind turbine comprising:
   increasing a rotational speed and a power output of the wind turbine with increasing wind speed until a prevailing wind speed reaches a rated wind speed;
   maintaining the rotational speed and the power output of the wind turbine;
   reducing the rotational speed and the power output of the wind turbine when the prevailing wind speed exceeds a predetermined first limit value;
   further reducing the rotational speed and the power output with an increasing wind speed beyond the predetermined first limit value as a function of at least one of: a gust intensity and a gust frequency of the prevailing wind until at least one of: the rotational speed reaches a predetermined minimum rotational speed and the power output reaches a predetermined minimum power; and
   if the wind speed further increases, maintaining at least one of the minimum rotational speed and the minimum power.

2. The method according to claim 1, wherein:
   if the wind speed further increases, the method further includes refraining from switching off the wind turbine.

3. The method according to claim 1, wherein maintaining the rotational speed and the power output of the wind turbine comprises:
   adjusting blade angles of rotor blades of the wind turbine so that the power output remains constant.

4. The method according to claim 1, wherein the function is of both the gust intensity and the gust frequency of the prevailing wind.

5. The method according to claim 1, wherein the minimum power is at least sufficient to supply operating devices of the wind turbine for operating the wind turbine.

6. A method for operating a plurality of wind turbines in a wind park, wherein each of the plurality of wind turbines is operated according to the method of claim 1.

7. The method according to claim 6, wherein in the event of wind speeds above the predetermined first limit value, at least one of the plurality of wind turbines generates power sufficient to supply operating devices of the plurality of wind turbines that the at least one wind turbine sends excess generated power, beyond the power sufficient to supply the operating devices of the at least one wind turbine, to another wind turbine of the plurality of wind turbines for operating devices of the other wind turbine.

8. A wind turbine configured to be operated by the method according to claim 1.

9. The wind turbine according to claim 8, wherein the wind turbine is gearless and has a synchronous generator.

10. A wind park having a plurality of wind turbines according to claim 8.

11. The wind park according to claim 10, wherein in the event of a gale, each wind turbine of the plurality of wind turbines generates enough power to respectively operate another wind turbine.

12. The method according to claim 5, wherein the wind turbine is a first wind turbine, wherein the minimum power is at least twice as much as necessary to supply the operating devices of the first wind turbine, the method further comprising using the minimum power to operate the first wind turbine and a second wind turbine.

13. The method according to claim 12, wherein the second wind turbine is of a same size as the first wind turbine.

14. The wind turbine according to claim 9, wherein a generator of the wind turbine is configured to be externally excited, wherein the wind turbine is configured as a horizontal-axis wind turbine, and has a plurality of rotor blades having adjustable angles of attack.

* * * * *